2 Sheets—Sheet 1.

G. D. MATCHAM.

SCRAPER.

No. 9,870. Reissued Sept. 13, 1881.

WITNESSES

Jno. Crowell Jr

George D. Matcham INVENTOR

By Leggett & Leggett

ATTORNEYS

2 Sheets—Sheet 2.

G. D. MATCHAM.

SCRAPER.

No. 9,870.

Reissued Sept. 13, 1881.

WITNESSES

W. Engel

Jno. Cowell Jr

George D. Matcham INVENTOR

By Leggett & Leggett.

ATTORNEYS

UNITED STATES PATENT OFFICE.

GEORGE D. MATCHAM, OF PITTSFIELD, OHIO.

SCRAPER.

SPECIFICATION forming part of Reissued Letters Patent No. 9,870, dated September 13, 1881.

Original No. 234,834, dated November 23, 1880. Application for reissue filed June 29, 1881.

*To all whom it may concern:*

Be it known that I, GEORGE D. MATCHAM, of Pittsfield, in the county of Lorain and State of Ohio, have invented new and useful Improvements in Road-Scrapers, of which the following is a description, reference being had to the accompanying drawings, making a part of this specification, in which—

Figure 1:
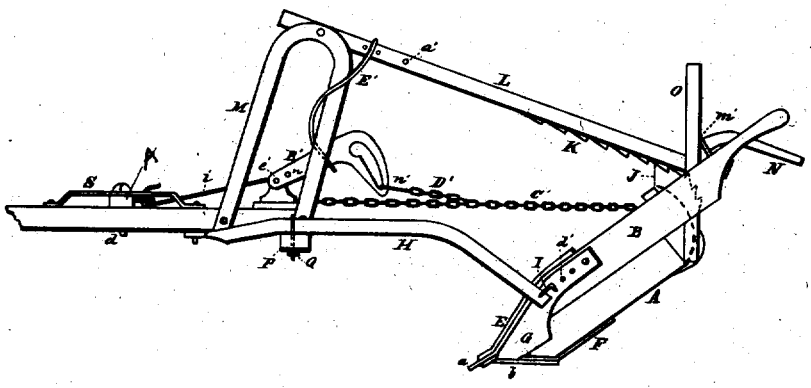
Figure 3:
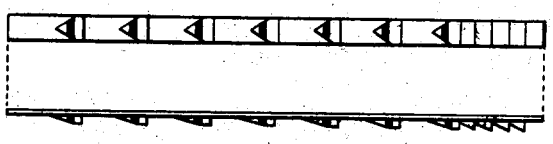
Figure 2:
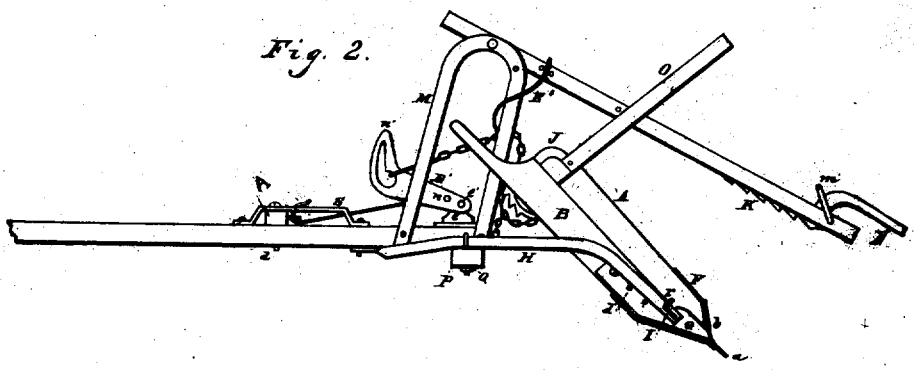
Figure 4:
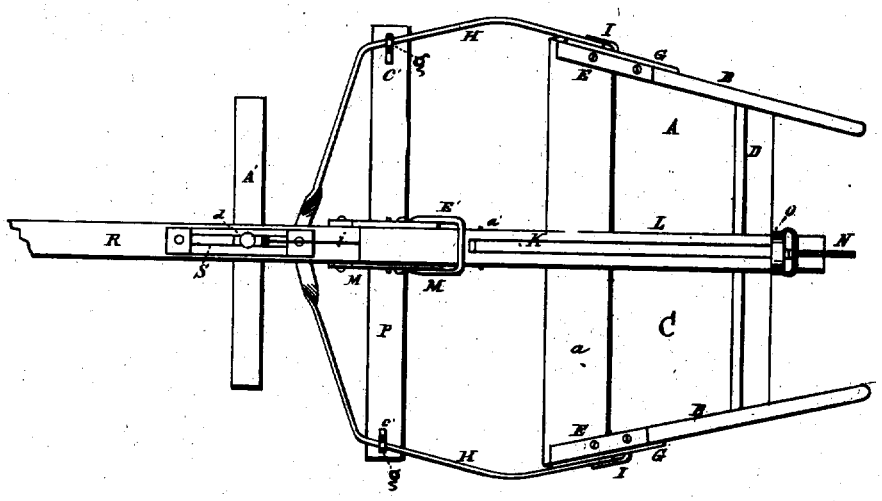
Figure 5:
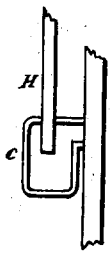
Figure 6:
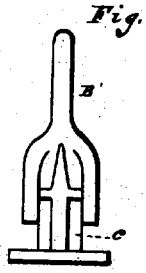

Figure 1 is a side view of the scraper in position for being loaded. Fig. 2 is a side view of the same when dumped. Fig. 3 is a rack, to which reference will be made. Fig. 4 is a plan view. Figs. 5 and 6 are detached sections.

Like letters of reference refer to like parts in the several views.

This invention relates to a self loading and discharging dirt-scraper, a full and complete description of which is as follows:

In the drawings, A represents the body of the scraper, which consists of the sides B, bottom C, and back D, all of which are like scrapers in ordinary use.

The edge of the scraper is metal, and consists of a plate, *a*, the lower edge of which is the cutting-edge. The upper edge of the plate is flush with the bottom of the scraper to prevent lodgment of dirt at the junction of the plate and bottom. Said plate is secured to the wood-work of the scraper by the straps E, riveted to the plate and bolted to the edge of the sides B. For further security a plate, *b*, is attached to the under side of plate *a*. The rear edge of plate *b* is secured to the scraper by straps F, riveted to the plate and bolted to the edge of the sides B, substantially as shown in the drawings.

To each side of the scraper is fixed a draft-plate, G, Figs. 1 and 4, to which the arms H are respectively pivoted by check-stirrups I. Said stirrup consists of a rod having one end turned at right angles and inserted loosely through the arm into the scraper, and secured therein by any suitable means. A portion of said rod is turned into a loop, *c*, Fig. 5, and then bent parallel to the opposite end and secured in the side of the scraper, as seen in said figure. The purpose of the check-stirrup will presently be shown.

To the back of the scraper is secured a segmental rack, J, arranged to engage a rack, K, projecting from the under side of the stay-bar L, pivoted to any suitable standards M, attached to the draft-pole, and extending therefrom back to the segmental rack, as seen in Fig. 1. Said rack K is pivoted at *a'* in the bar L, a slot being made therein for its admission, and wherein it is moved upward and downward by the handle N, for engaging and disengaging it from the segmental rack alluded to.

O, Figs. 1 and 4, is a guide for holding from lateral movement the end of the bar L. Said guide is pivoted to the segmental rack J and allowed a movement in alignment with the bar.

P is a cross-piece, on which the arms H rest, and are secured thereto by strap-bolts *g*, which are adjustable in slots *c'*, Fig. 4. To the cross-piece alluded to is secured the tongue R, to the under side of which are pivoted the ends of the arms H. To the upper side of the tongue is attached the evener A' of the double-tree by means of the slotted hammer-strap S, in the slot of which the hammer-bolt is inserted. A corresponding slot is made in the tongue, through which the bolt passes and slides therein, as and for the purpose presently shown.

Between the standards M is fixed to the tongue R a stud, *e*, to which is pivoted a dumping-arm, B'. Said arm is attached to the evener A' by a rod, *i*, provided with a hook, whereby it is hooked into a staple of the evener. The opposite end of the rod is pivoted to the arm B' at *n*. A draft-chain, C', connects the back of the scraper to the stud *e*, and a dumping-chain, D', connects the arm B' to the chain C', as shown in Fig. 1.

E' is a yoke the upper part of which is around the bar L, whereas the lower part of the yoke is around the dumping-arm for lifting said arm when it is in the position shown in Fig. 1.

Having described the construction of the scraper and the devices for operating the same, the practical operation thereof is as follows: The position of the machine, as shown in Fig. 1, is such as when ready for scraping. In this position it will be seen that the check-bar L is locked by the rack K to the segmental rack J, in which engagement it may be held by a yoke, *m'*, attached to the end of the bar and thrown up over the handle N of the rack, thereby retaining the rack below the under side of the bar, that it may engage the segment J. By this engagement of the two racks the scraper cannot turn over while being filled, the check-bar and rack holding it firmly in position. The draft in pulling forward the scraper is exerted mainly upon the rod *i*, dumping-arm, and chain C′, there being at this time but little draft upon the dumping-chain D′, as the line of draft is very near the pivotal point *n*′. In order to dump the scraper the operator lifts the check-bar from its engagement with the rack J. The scraper when released from the check will be pulled over to the position shown in Fig. 2 by the dumping-arm, which, on lifting the check-bar, causes the yoke E′ to lift upward the dumping-arm, thereby bringing the points *n* and *n*′ so far above the pivotal point *e*′ of the arm that it is easily and readily drawn forward from the position shown in Fig. 1 to that shown in Fig. 2, and at the same time draws with it the scraper by virtue of the chain D′ by its connection with the chain C′ and dumping-arm. In this act of turning or dumping the scraper the double-tree also moves forward by the hammer-bolt moving along in the hammer-strap, thereby pulling forward the arm for dumping the scraper.

It will be observed that the dumping-chain D′ is attached to the extreme end of the dumping-arm at *n*′, the link of the chain being held in the lower end of the slot. Hence on lifting the arm the chain D′ will be drawn rapidly upward as well as forward, thereby drawing upon the scraper in a lifting manner as the end of the arm and the back of the scraper move upward and forward in the same direction and at the same time.

The operator can at any time check the dumping movement of the scraper by means of the bar for the purpose of leveling the dirt with the edge of the scraper.

To prevent the scraper from turning so far over as to strike upon the cross-piece P is the purpose of the stirrup I, against which the arms H impinge, as seen at *r* in Fig. 2, thereby retaining the scraper in the position seen in said Fig. 2.

The edge of the scraper may be caused to scrape more or less deeply into the ground by shifting the connections of the arms therewith nearer to or farther from the scraping-edge. The holes *d*′ are made in the sides for that purpose. More or less angle can be given to the position of the scraper for scraping, or it can be held in a vertical position for leveling dirt by adjusting the check-bar in its engagement with the segment-rack J, as above described.

Scrapers of different widths can be used in connection with the dumping device by adapting the width of the arms to the scraper, which may be done by loosening the strap-bolts *g*, thereby allowing the arms to be spread out or closed in, as the width of the scraper may require.

Fig. 3, Plate 1, represents a rack, which may be secured to the under side of the check-bar in lieu of the rack K.

What I claim as my invention and desire to secure by Letters Patent is—

1. In a road-scraper, the combination of a scraper having a segment-rack attached to its rear end with a check-bar pivoted to a suitable support beyond or in front of the point of the scraper, said check-bar provided with a rack adapted to engage with the segment-rack attached to the rear of the scraper, substantially as and for the purpose specified.

2. In a road-scraper, the combination, with the scraper, of a movable evener and means, substantially as described, for transferring a portion of the draft to the rear of the scraper, substantially as set forth.

3. In a road-scraper, the combination, with the scraper, of a movable evener, a dumping-arm, and means, substantially as described, for connecting the dumping-arm with the movable evener and scraper, substantially as set forth.

4. In a road-scraper, the combination of a movable evener connected with a dumping-arm pivoted at a point back of the evener and forward of the point of the scraper and a chain connecting the dumping-arm with the rear portion of the scraper, substantially as and for the purposes specified.

5. In a road-scraper, a slotted pole and hammer-strap through which the bail holding the evener may pass, whereby the evener is permitted to have a horizontal movement, substantially as and for the purposes shown.

6. In a road-scraper, a slotted pole and hammer-strap, in combination with a movable evener, said movable evener connected with the rear portion of the scraper, substantially as and for the purposes specified.

7. In a road-scraper, the combination of the scraper A with a segment-rack and check-bar provided with teeth adapted to engage with the segment-rack, substantially as and for the purposes shown.

8. In a road-scraper, the dumping-arm B′ and chain C′, in combination with the scraper A, substantially as and for the purposes shown.

9. In a road-scraper, the check-stirrups I, through which the bail of the scraper is connected with the body, said stirrup so constructed as to present a bearing to the bail when the scraper is dumped, substantially as and for the purposes shown.

10. The combination of the scraper A with the segment-rack, check-bar, and adjustable rack K, pivoted therein, and standards M, substantially as described and for the purpose set forth.

11. The dumping-arm B′ and chains D′ and C′, in combination with the scraper, substantially as and for the purpose specified.

12. The sliding double-tree evener A′, slotted hammer-strap and pole, bolt *d*, and rod *i*, in combination with the dumping-arm, substantially as and for the purpose set forth.

13. In combination with the check L and dumping-arm, the yoke E′, as and for the purpose specified.

14. In dirt-scrapers, the adjustable arms H and check-stirrups, in combination with the scraper, as described and for the purposes specified.

15. The combination of the scraper, segmental rack, and rack K, pivoted in the bar L, yoke E′, chains and dumping-arm, rod *i*, sliding evener, and adjustable arms H, and check-stirrups, constructed and arranged as described and for the purpose set forth.

In testimony whereof I affix my signature in the presence of two subscribing witnesses.

GEORGE D. MATCHAM.

In presence of—

JNO. CROWELL, Jr.,

H. MORAN.